April 9, 1946.  S. E. WERNER  2,398,065
ANTIFRICTION MECHANISM
Filed Feb. 8, 1943
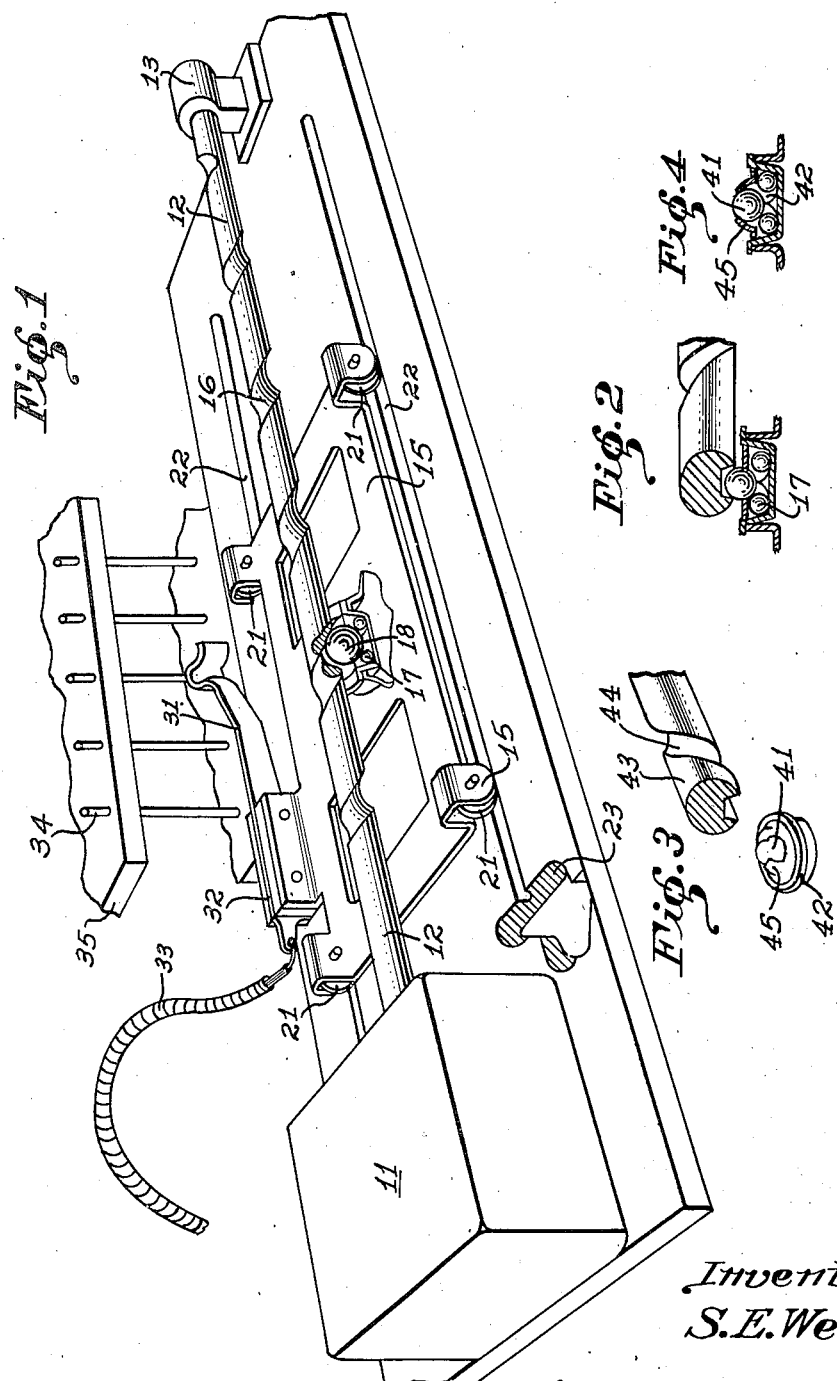
Inventor:
S. E. Werner
By Hascock, Downing & Seebold
Attorney Patented Apr. 9, 1946

2,398,065

UNITED STATES PATENT OFFICE 2,398,065

ANTIFRICTION MECHANISM

Sture Edvard Werner, Engelbrektsgatan 19, Stockholm, Sweden, assignor to Telefonaktiebolaget L. M. Ericsson, Stockholm, Sweden, a company of Sweden Application February 8, 1943, Serial No. 475,142
In Sweden December 17, 1941

3 Claims. (Cl. 74—459)

The present invention relates to an arrangement for movement transmission from a rotary movement to a linear one. It is especially adapted for use in selectors in automatic telephone plants. The object of the invention is to produce a cheap and reliable device making possible such a movement transmission with only negligible friction losses. According to the invention this will be chiefly obtained by a ball being placed between the thread on a rotatable screw spindle and a recess in a linearly movable device, for instance a carriage supporting the wipers of a selector.

The invention will be more closely described with reference to the annexed drawing showing an example of the application of the invention to a selector driven by a motor, said selector being especially intended for an automatic telephone plant.

Fig. 1 shows a perspective view of the selector.

Fig. 2 is a perspective view partly in section of a portion of the selector showing the ball bearing in detail.

Fig. 3 is a perspective view similar to Fig. 2 showing a modification of the invention.

Fig. 4 is a sectional view of the ball bearing shown in Fig. 3.

The drawing shows solely the parts of the selector necessary to explain the invention.

The selector, Fig. 1, comprises a driving motor 11 which can be of a known performance, for instance of such a construction that is more closely described in the Swedish patent application No. 6247/41 (U. S. application Ser. No. 463,562, filed October 27, 1942). A screw spindle 12 is with its one end rigidly coupled to the axle of the motor and with the other it is supported in a ball bearing 13 mounted on a bed-plate 23 in conformity with the motor. Upon the rotation of the rotor axle and the screw spindle 12 the carriage 15 is driven forward axially by means of the transmitting device constructed according to the invention. This carriage supports the movable contact devices of the selector. In the carriage there is a hole and in this a ball bearing 17 has been placed. The distance between this bearing and the screw spindle is such that a single ball 18 of a suitable dimension can be placed between the bearing and the thread 16 of the screw spindle. The lower part of the ball 18 thereby lies between the balls 17 of the bearing, its upper part fitting into the screw thread 16. When the screw spindle rotates in a certain direction the ball will follow the screw thread and because of the pressure from the side of the thread track against the ball, the latter is turned round in the ball bearing at the same time as it moves the wiper shaft forward linearly in one direction parallel to the length of the screw spindle. This coupling between the screw spindle and the carriage works with only negligible friction. The bottom of the ball bearing is a little elastic so as to compensate eventual unevennesses in the thread 16 or in the bottom of the carriage. The carriage rolls on four wheels 21 along the track 22 in the bed-plate 23.

On the carriage 15 the necessary contact springs are to be found. In the drawing only one of these springs 31 is shown. Upon the rotation of the carriage the spring 31 is brought along a contact field consisting of wires 34 mounted between insulating plates 35. The spring 31 is in the usual manner attached to a holder 32 and over a flexible cable 33 it is connected with the rest of the appertaining electrical devices. When the spring 31 makes contact with a conductor 34, said conductor having a certain electrical state, a circuit will be closed in the usual manner over the contact position and the cable 33, whereby the motor is stopped in a known manner. When the carriage comes to rest, the ball will lie against the both sides in the thread. Hereby a very good centering is obtained as no free motion will arise. When the motor axle stops in a certain position the carriage, too, will stop in a fixed position. The construction is such that the carriage can be moved forward or backward very easily dependent on the rotation of the spindle axle in one direction or the other.

Fig. 3 and Fig. 4 show an altered embodiment of the transmitting device between the screw spindle and the carriage. The screw spindle 43 with its screw thread 44, shown in Fig. 3, corresponds to the spindle and the thread in accordance to Fig. 1. In the same manner the ball 41 and the ball bearing 42 in Figs. 3 and 4 correspond to the ball 18 respectively the ball bearing 17 in Fig. 1. The ball 41, however, is retained in the ball bearing in this altered embodiment by means of flaps 45 in the bearing house said flaps having been turned up over a part of the upper half of the ball 41 as shown in Figs. 3 and 4. These flaps prevent the ball from becoming displaced from the mounting.

In the described embodiment the invention has been applied in connection with a selector, driven by a motor. In this selector a carriage with wipers can be moved from a starting position in one direction to a certain position and thereafter in the opposite direction back to the starting position. The principle of the invention can naturally be applied to many other embodiments. The carriage can thus be provided with several wiper shafts moved longitudinally of the screw spindle. The same screw spindle can drive many wiper shafts. The pitch of the thread along the screw spindle can be varied in dependence upon the relation that is wanted between the velocity of the rotor and the velocity of the carriage. A different pitch can furthermore be given to different sections of the screw spindle.

I claim:

1. In an arrangement of the character described, a rotatable threaded spindle, a linearly movable carriage, a ball retainer on said carriage, a plurality of bearing balls mounted in said retainer, and a single ball supported in raised position between said bearing balls and engaging the thread of said spindle.

2. An arrangement as claimed in claim 1 wherein the ball retainer includes an elastic portion acting on the bearing balls to yieldably maintain said single ball in engagement with said thread.

3. An arrangement as claimed in claim 1 wherein said ball retainer is provided with a flap-like portion to maintain said single ball in position.

STURE EDVARD WERNER.